United States Patent
Bang et al.

(10) Patent No.: US 8,184,606 B2
(45) Date of Patent: May 22, 2012

(54) APPARATUS AND METHOD FOR MONITORING BASE STATION SIGNAL IN COMMUNICATION SYSTEM HAVING MULTIPLE ANTENNAS

(75) Inventors: Young-Jo Bang, Daejeon (KR); Youn-Ok Park, Daejeon (KR); Yong-Su Lee, Daejeon (KR)

(73) Assignees: Samsung Electronics Co., Ltd., Suwon-si (KR); Electronics and Telecommunications Research Institute, Daejeon (KR); SK Telecom Co., Ltd., Seoul (KR); KT Corporation, Seongnam (KR); Hanaro Telecom, Inc., Seoul (KR)

( * ) Notice: Subject to any disclaimer, the term of this patent is extended or adjusted under 35 U.S.C. 154(b) by 442 days.

(21) Appl. No.: 12/094,897

(22) PCT Filed: Dec. 8, 2006

(86) PCT No.: PCT/KR2006/005315
§ 371 (c)(1),
(2), (4) Date: May 23, 2008

(87) PCT Pub. No.: WO2007/067002
PCT Pub. Date: Jun. 14, 2007

(65) Prior Publication Data
US 2008/0310318 A1    Dec. 18, 2008

(30) Foreign Application Priority Data
Dec. 8, 2005  (KR) .................. 10-2005-0119883

(51) Int. Cl.
*H04H 20/67* (2008.01)
(52) U.S. Cl. .......................... 370/339; 342/368
(58) Field of Classification Search .......... 370/338–339; 342/368
See application file for complete search history.

(56) References Cited

U.S. PATENT DOCUMENTS

| | | | |
|---|---|---|---|
| 5,940,032 A | 8/1999 | Passmann et al. | |
| 5,978,659 A | 11/1999 | Kim | |
| 6,157,343 A * | 12/2000 | Andersson et al. | 342/371 |
| 6,480,153 B1 * | 11/2002 | Jung et al. | 342/368 |
| 6,985,466 B1 * | 1/2006 | Yun et al. | 370/335 |
| 7,035,592 B1 * | 4/2006 | Doi et al. | 455/67.11 |
| 7,205,936 B2 * | 4/2007 | Park et al. | 342/368 |
| 7,423,586 B2 * | 9/2008 | Schieblich | 342/368 |
| 2002/0071406 A1 * | 6/2002 | Bursztejn et al. | 370/334 |
| 2005/0140546 A1 | 6/2005 | Park et al. | |

FOREIGN PATENT DOCUMENTS

| | | |
|---|---|---|
| GB | 2342505 A | 4/2000 |
| KR | 10-2005-0053052 A | 6/2005 |
| KR | 10-2005-0087378 A | 8/2005 |
| KR | 10-2005-0090329 A | 9/2005 |
| WO | 98/37640 A1 | 8/1998 |
| WO | 99/33297 A1 | 7/1999 |

* cited by examiner

*Primary Examiner* — Phuc Tran
(74) *Attorney, Agent, or Firm* — Jefferson IP Law, LLP (57) ABSTRACT

In a signal monitoring apparatus of a base station of a communication system having multiple antennas, a transmitting/receiving unit transmits a plurality of transmit signals by using the multiple antennas or processes a plurality of receive signals received through the multiple antennas. A radio frequency calibration unit calibrates the transmit signals transmitted through the multiple antennas, and processes at least one target transmit signal among the plurality of transmit signals so as to monitor the at least one target transmit signal. A signal monitoring unit receives at least one first signal or at least one second signal, and transmits the at least one first signal or the at least one second signal to user equipment. The at least one first signal is a signal processed from at least one target receive signal among the plurality of receive signals, and the at least one second signal is a signal processed from the at least one target transmit signal by controlling the radio frequency calibration unit.

12 Claims, 9 Drawing Sheets

APPARATUS AND METHOD FOR MONITORING BASE STATION SIGNAL IN COMMUNICATION SYSTEM HAVING MULTIPLE ANTENNAS

TECHNICAL FIELD

The present invention relates to a method for monitoring a base station signal of a communication system using multiple antennas, and an apparatus using the same. More particularly, the present invention relates to a signal monitoring apparatus that can efficiently monitor a base station signal.

BACKGROUND ART

A base station and use equipment (UE) in a mobile communication system transmits/receives a signal by using a frequency division duplex (FDD) method or a time division duplex (TDD) method. The FDD method separates the signal into different frequency bands, i.e., a transmit frequency and a receive frequency, and the TDD method uses the transmit frequency and the receive frequency together.

Figure 1:
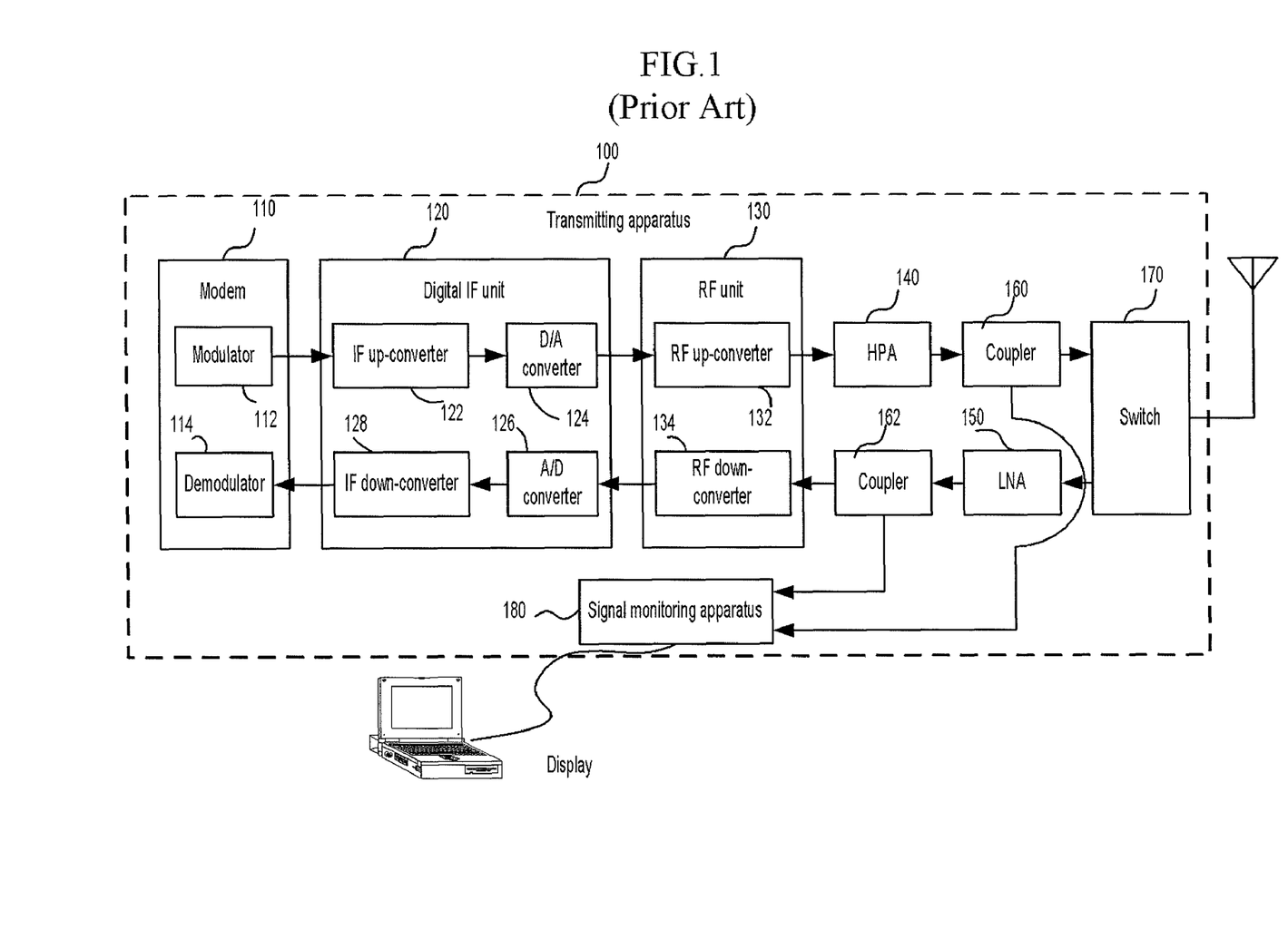
FIG. 1 shows connections between a signal monitoring apparatus and a transmitting unit of a TDD-based base station according to a prior art.

FIG. 1 shows connections between a signal monitoring apparatus and a transmitting unit of a TDD-based base station according to a prior art.

As shown in FIG. 1, a transmitting apparatus 100 of the TDD-based base station includes a modem 110, a digital intermediate frequency (IF) unit 120, a radio frequency (RF) unit 130, a high power amplifier (HPA) 140, couplers 160 and 162, and a low noise amplifier (LNA) 150. The transmitting apparatus 100 connects the signal monitoring apparatus and a transmitting unit of the TDD-based base station.

The modem 110 includes a modulator 112 for modulating a data signal into a quadrature phase shift keying (QPSK) signal or a M-ary quadrature amplitude modulation (QAM) signal, and a demodulator 114 for demodulating a digital IF signal into a baseband signal.

The digital IF unit 120 includes an IF up-converter 112 for frequency-up converting a signal modulated by the modulator 112 and a digital to analog (D/A) converter 124 for converting the up-converted digital signal into an analog signal.

The IF signal processed through the D/A converter 124 is converted into an RF signal by an RF up-converter 132, and the RF signal is converted into a high power signal for wireless transmission by the HPA 140, and then the high power signal is passed through an input/output switch and transmitted through an antenna. In this case, an output signal of the HPA 140 is input to the base station monitoring apparatus 180 passed through the coupler 160 and monitored by a signal monitoring apparatus 180.

A signal received through the antenna is input to the LNA 150 and amplified by the LNA 150, and is converted into an RF signal through an RF down-converter 134. The RF signal is input to an A/D converter 126 and converted into a digital IF signal, and the digital IF signal is converted into a baseband signal through a digital IF down-converter 128. The baseband signal is input to the demodulator 114 and demodulated. In this case, an output signal of the LNA 150 is passed through the coupler 162 and input to the signal monitoring apparatus 180 for monitoring the receive signal.

Figure 2:
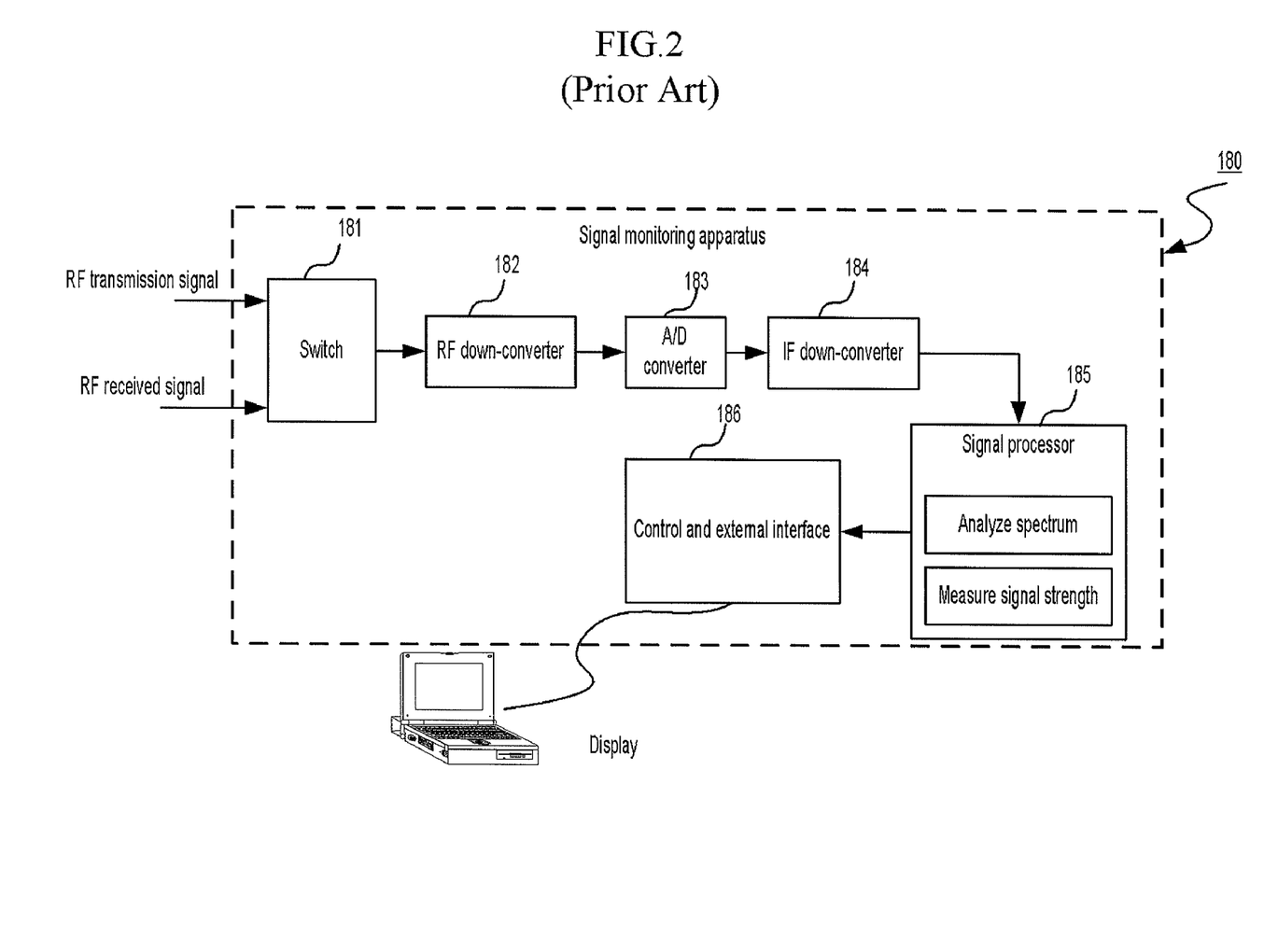
FIG. 2 is a schematic block diagram of the signal monitoring apparatus of the base station according to the prior art.

FIG. 2 is a configuration diagram of the signal monitoring apparatus of the base station monitoring apparatus according to the prior art.

As shown in FIG. 2, the signal monitoring apparatus 180 includes a switch 181, an RF down-converter 182, an A/D converter 183, an IF down-converter 184, a signal processor 185, and a control and external interface 186.

The switch 181 selects either a transmit signal or a receive signal for monitoring. An output RF signal of the switch 181 is converted into a predetermined IF frequency (e.g., 70 MHz), and is converted into a baseband signal through the A/D converter 183 and the digital IF down-converter 184. Then, the baseband signal is input to the signal processor 185.

The signal processor 185 measures a baseband signal spectrum and a baseband signal strength, and transmits the measured value to a display medium (e.g., a notebook) through the control and external interface 186.

Such a monitoring apparatus has been typically applied to a base station using a single antenna, and thus, there is no prior art related to application of the monitoring apparatus to a system using multiple antennas.

In addition, when the system using the multiple antennas employs the conventional signal monitoring apparatus, the signal monitoring apparatus of FIG. 2 must be provided for each antenna, and accordingly, a structure of the base station becomes complicated.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a signal monitoring apparatus of a base station having advantages of sharing an RF calibration apparatus for signal monitoring.

Technical Solution

An exemplary signal monitoring apparatus according to the present invention is provided to a base station in a communication system having a plurality of antennas. The signal monitoring apparatus includes a transmitting/receiving unit, a radio frequency calibration unit, and a signal monitoring unit. The transmitting/receiving unit transmits a plurality of transmit signals by using the plurality of antennas and processes a plurality of receive signals received through the plurality of antennas. The radio frequency calibration unit calibrates the plurality of transmit signals transmitted through the plurality of antennas, and processes at least one target transmit signal among the plurality of transmit signals so as to monitor the at least one target transmit signal. The signal monitoring unit receives at least one first signal or at least one second signal, and analyzes the at least one first signal or the at least one second signal to transmit the analysis result to user equipment (UE). The at least one first signal is a signal processed from the at least one target receive signal, and the at least one second signal is a signal processed from the at least one target transmit signal by controlling the radio frequency calibration unit.

An exemplary signal monitoring apparatus according to another embodiment of the present invention is provided to a base station of a communication system having a plurality of antennas. The signal monitoring apparatus includes means for calibration of a plurality of transmitting signals to be respectively transmitted through the plurality of antennas so as to equalize characteristics of the respective transmit signals, and for processing at least one target transmit signal among the plurality of transmit signals while not performing the calibration; and means for analyzing a signal processed from the at least one target transmit signal and transmitting the analysis result to user equipment.

An exemplary method according to another embodiment of the present invention monitors a signal of a base station of a communication system having a plurality of antennas. The method includes: calibrating a plurality of transmit signals to be transmitted through the plurality of antennas so as to equalize characteristics of the respective transmit signals; processing at least one target transmit signal among the plurality of transmit signals while the calibration is not performed; and analyzing a signal processed from the at least one target transmit signal to transmit the analysis result to user equipment.

Advantageous Effects

According to the present invention, in configuration of the signal monitoring apparatus for a transmit/receive signal of the base station, the RF calibration apparatus used for calibrating an RF signal is shared and the signal monitoring unit is embedded in a digital IF processing board so that a transmit/receive signal state of the base station can be efficiently monitored, and the signal monitoring apparatus can be inexpensively installed on all base stations, thereby reducing cost.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Figure 3:
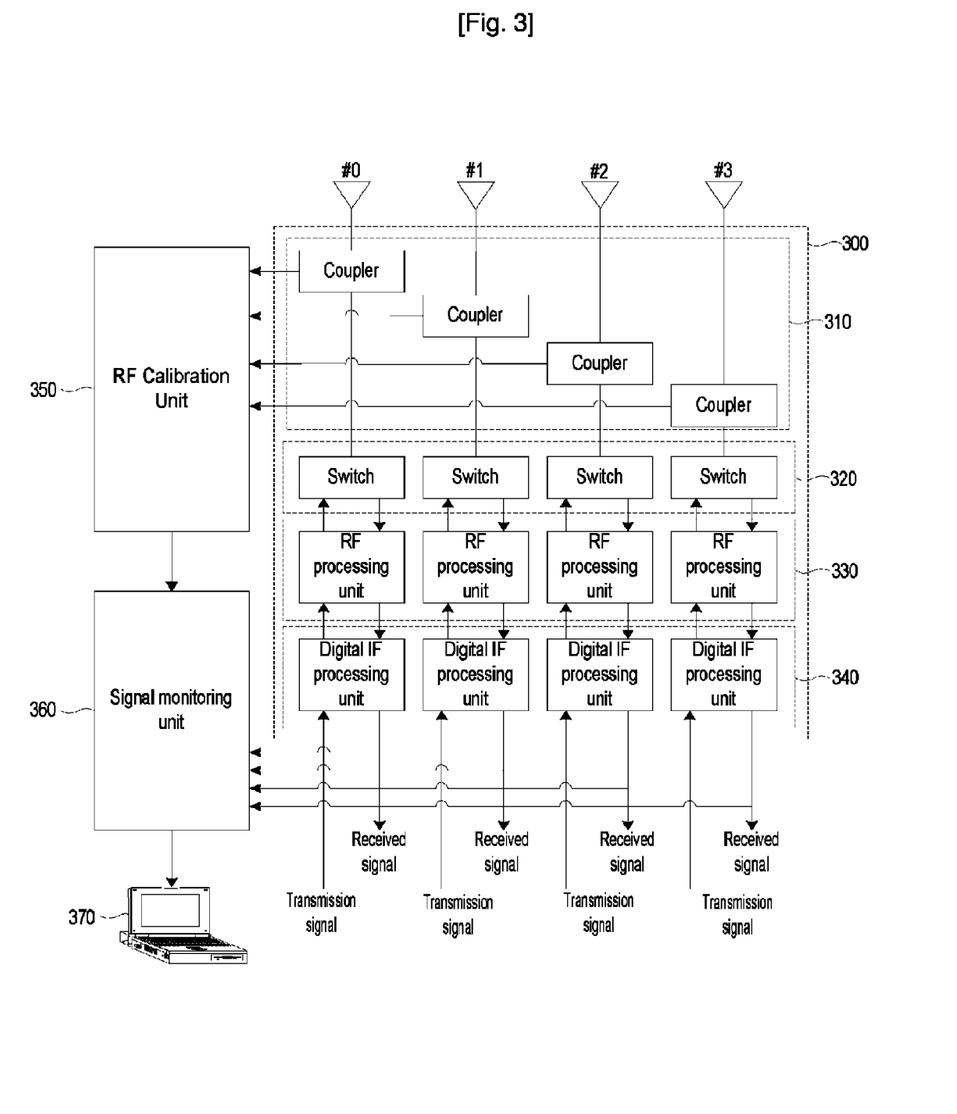
FIG. 3 is a schematic block diagram showing a signal monitoring apparatus of a base station in a communication system having multiple antennas according to an exemplary embodiment of the present invention.

FIG. 3 is a schematic block diagram showing a signal monitoring apparatus of a base station in a communication system having multiple antennas according to an exemplary embodiment of the present invention. In FIG. 3, the multiple antennas are illustrated as four antennas #0, #1, #2, and #3 for convenience of description.

As shown in FIG. 3, the signal monitoring apparatus includes a transmitting/receiving unit 300, a radio frequency (RF) calibration unit 350, and a signal monitoring unit 360. In addition, the signal monitoring unit 300 of the signal monitoring apparatus has a wired or wireless connection with user equipment (UE) 370.

The transmitting/receiving unit 300 includes a plurality of couplers 310, a plurality of switches 320, a plurality of RF processors 330, and a plurality of digital intermediate frequency (IF) processors 340. Herein, one coupler 310, one switch 320, one IF processor 330, and one digital IF processor 340 corresponds to one antenna among the multiple antennas.

The coupler 310 extracts RF signal power to check characteristics of the RF signal and divides the RF signal, without interrupting flow of an RF signal transmitted/received through a corresponding antenna. That is, the coupler 310 extracts a small amount of RF signal power within a range that does not affect transmit RF signal power or receive RF signal power, and transmits the extracted power to the RF calibration unit 350. Although the receive RF signal or transmit RF signal input to the RF calibration unit 350 from the coupler 310 is weaker than an original signal, the RF signal includes all components of the original signal.

The switch 320 includes a switch (not shown) for delivering a transmit RF signal transmitted from a corresponding RF processor 330 to a corresponding coupler 310 and a switch (not shown) for delivering a receive RF signal received from the corresponding coupler 310 to the corresponding RF processor 330. That is, the switch 320 transmits a signal in the direction of the antenna or inverse to the direction of the antenna according to a transmit signal or a receive signal.

The RF processor 330 will be described in more detail with reference to FIG. 4.

Figure 4:
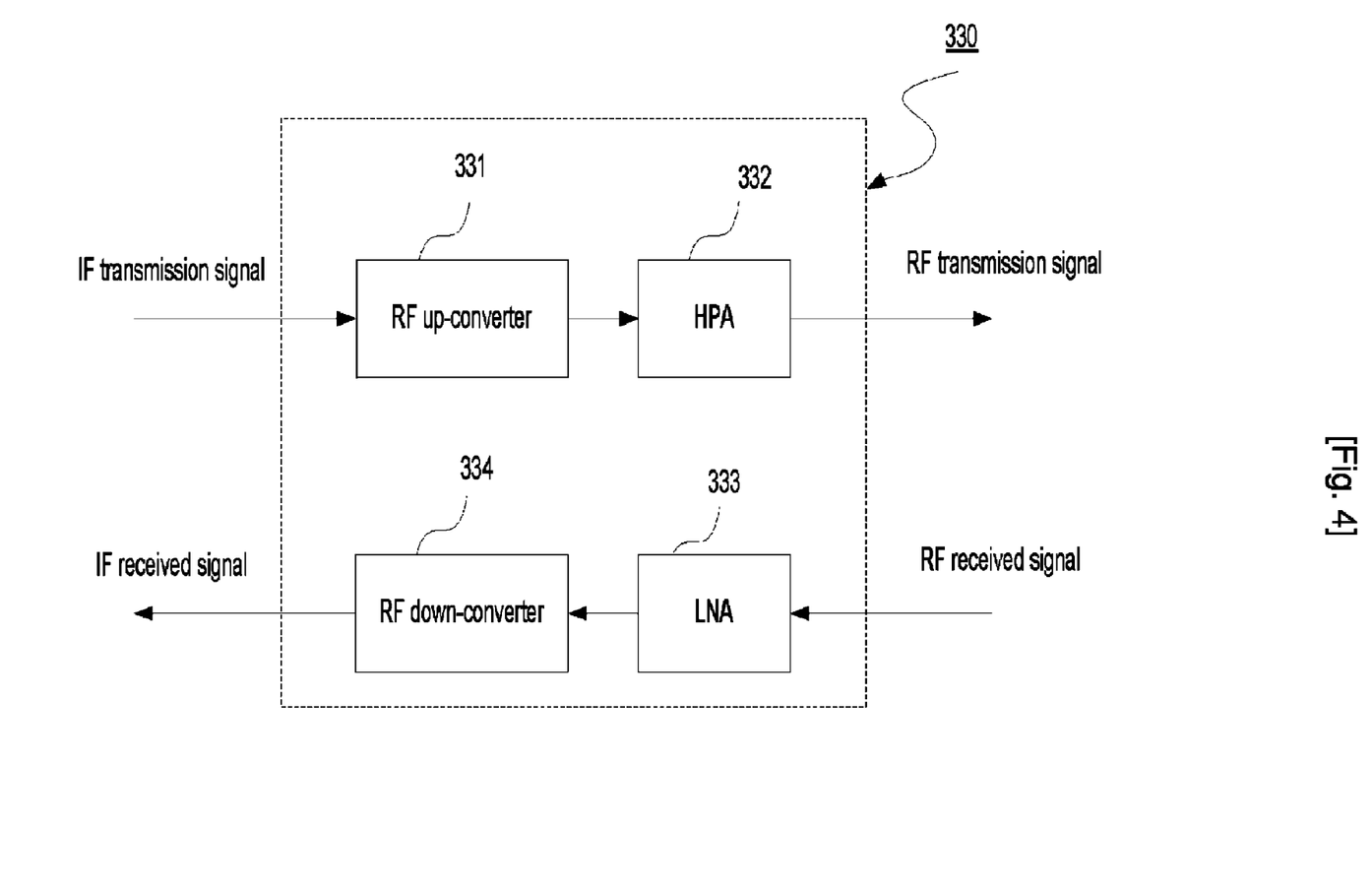
FIG. 4 is a schematic block diagram of an RF processor according to the exemplary embodiment of the present invention.

FIG. 4 is a schematic block diagram of an RF processor according to the exemplary embodiment of the present invention.

As shown in FIG. 4, the RF processor 330 includes an RF up-converter 331, a high power amplifier (HPA) 332, an RF down-converter 333, and a low noise amplifier (LNA) 334. Herein, the RF up-converter 331 and the HPA 332 are included in a first RF processing unit, and the RF down-converter 334 and the LNA 333 are included in a second RD processing unit.

The RF up-converter 331 up-converts an analog IF transmit signal to an RF transmit signal, and the HPA 332 converts the RF transmit signal converted by the RF up-converter 331 into a high power signal for radio transmission. The LNA 334 converts an RF receive signal received through an antenna into a low noise signal, and the RF down-converter 333 down-converts the RF receive signal converted by the LNA 334 into an IF receive signal.

The IF receive signal output from the RF processor 330 is input to the digital IF processor (340 of FIG. 3), and the IF transmit signal input to the RF processor 330 is output from the digital IF processor 340.

The digital IF processor 340 will be described in more detail with reference to FIG. 5.

Figure 5:
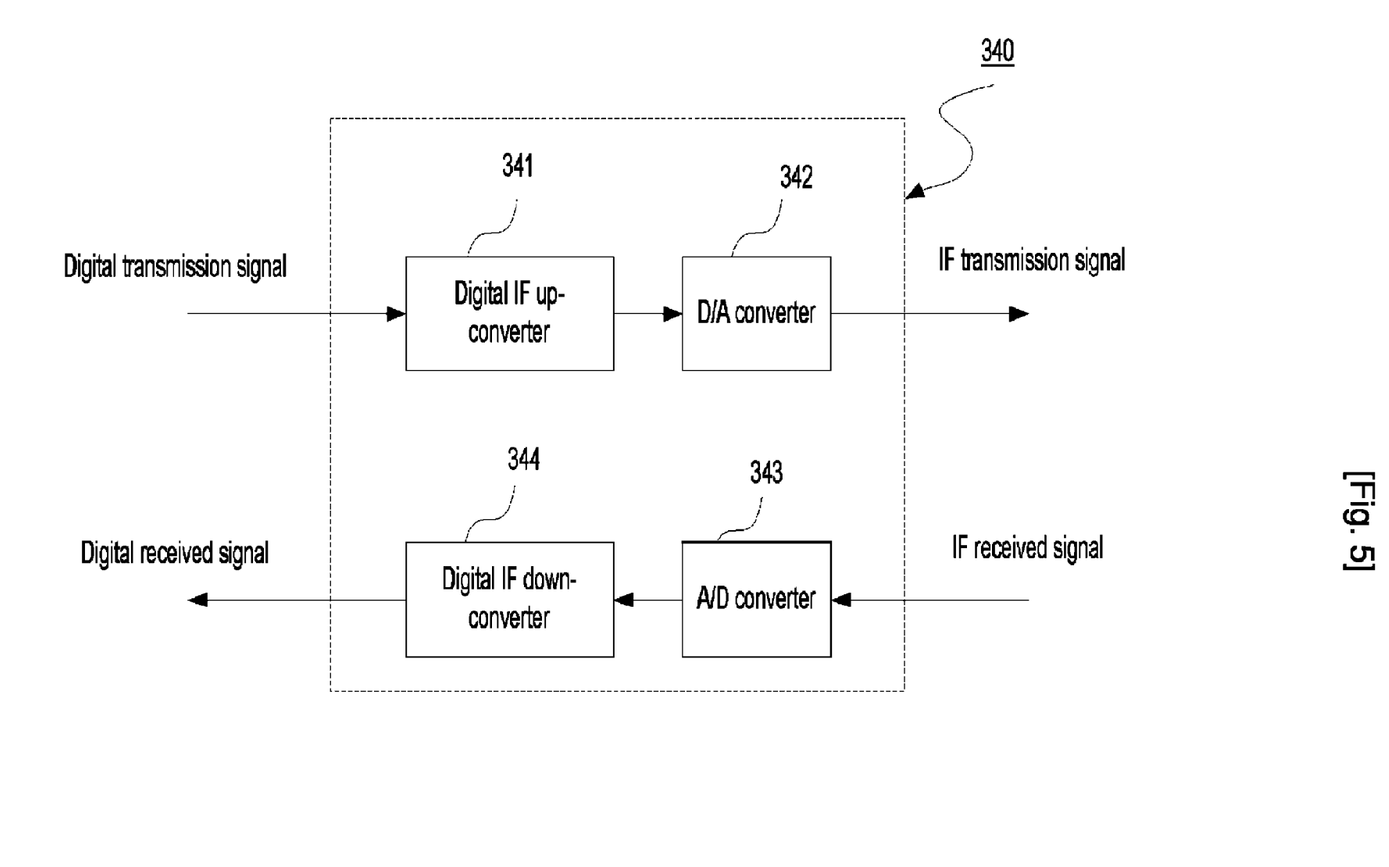
FIG. 5 is a schematic block diagram of a digital IF processor according to the exemplary embodiment of the present invention.

FIG. 5 is a schematic block diagram of a digital IF processor according to the exemplary embodiment of the present invention.

As shown in FIG. 5, the digital IF processor 340 includes a digital IF up-converter 341, a digital to analog (D/A) converter 342, a digital IF down-converter 344, and an analog to digital (A/D) converter 343.

Herein, the digital IF up-converter 341 and the D/A converter 342 are included in a first digital intermediate frequency (IF) processor, and the digital IF down-converter 344 and the A/D converter 343 are included in a second digital IF processor.

The digital IF up-converter 341 receives a baseband digital transmit signal and frequency up-converts the baseband digital transmit signal into an IF signal, and the IF signal is converted to an analog IF transmit signal by the D/A converter 342 and then input to the RF processor 330. Herein, the baseband digital transmit signal is modulated by a modulator (not shown). A signal frequency down-converted by the RF processor 330 is sampled to an IF by the A/D converter 343 and converted into a digital IF signal, the digital IF signal I is converted into a baseband signal through the digital IF down-converter 344, and the baseband signal is input to a demodulator (not shown) and demodulated.

Each antenna of the smart antenna system must have the same RF or IF characteristics. However, it is difficult to make RF or IF characteristics of the respective antennas the same when implementing multiple antennas with substantial software. Therefore, according to the exemplary embodiment of the present invention, the RF calibration unit 350 collects a reference signal transmitted through each antenna, obtains a relative size and phase compared to a reference antenna (e.g., antenna #0 of FIG. 3), and calculates a weight of the corresponding antenna by an inverse value of the relative size and phase and multiplies a transmit signal by the weight in advance. Accordingly, the RF calibration unit 350 calibrates delay and phase differences of a plurality of transmit signals to be transmitted through multiple paths of the multiple antennas such that RF characteristics or IF characteristics of all the antennas become substantially equal to each other.

The RF calibration unit 350 will be described in more detail with reference to FIG. 6.

Figure 6:
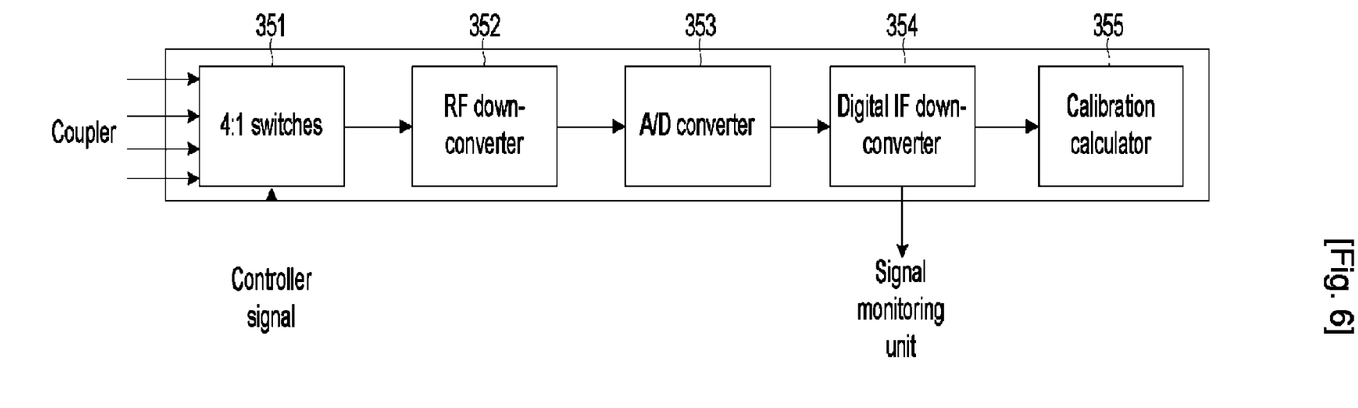
FIG. 6 is a schematic block diagram of an RF calibration unit according to the exemplary embodiment of the present invention.

FIG. 6 is a schematic block diagram of an RF calibration unit according to the exemplary embodiment of the present invention.

As shown in FIG. 6, the RF calibration unit 350 includes 4:1 switches 351, an RF down-converter 352, an A/D converter 353, a digital IF down-converter 354, and a calibration calculator 355.

The 4:1 switches 351 receive a target RF transmit signal selected to be monitored from four RF transmit signals extracted by the coupler 310 from among RF transmit signals to be transmitted through the four antennas of FIG. 3. For RF calibration, the 4:1 switches 351 may receive four reference signals, respectively corresponding to the four antennas. Herein, the four reference signals are signals extracted by the coupler 310 from RF transmit signals transmitted through the RF processor 330 and the switch 320.

In this case, the 4:1 switches 351 are switches corresponding to the four antennas of FIG. 3, and it may vary depending on the number of antennas.

The RF down-converter 352, the A/D converter 353, and the digital IF down-converter 354 perform the same or similar functions as those of the RF down-converter 334 of the RF processor 330 shown in FIG. 4 and the A/D converter 343 and the digital IF down-converter 344 of the digital IF processor 340 shown in FIG. 5, and therefore further description related thereto will be omitted.

The calibration calculator 355 calculates a relative size and phase of another antenna with respect to a reference antenna (e.g., antenna #0 of FIG. 3) by using a reference signal of each antenna. In addition, the calibration calculator 355 calculates a weight value for each antenna by using the relative size and phase, and multiplies a signal to be transmitted through each antenna by the weight value. That is, the calibration calculator 355 extracts a calibration coefficient required to equalize characteristics of an RF transmit signal and characteristics of an IF transmit signal by using a digital baseband transmit signal.

In this case, the RF calibration unit 350 calculates a calibration value corresponding to time and temperature variations, and therefore the RF calibration unit 350 does not need to frequently perform a calibration process. Therefore, the RF calibration unit 350 does not perform the calibration function most of the time.

For example, when RF signal calibration is performed every hour, the RF calibration unit 350 collects an RF signal from the coupler 310 for 3 to 4 minutes per hour and calculates a weight value for a corresponding antenna. Therefore, according to the exemplary embodiment of the present invention, the RF calibration unit 350 is shared for monitoring transmit signals of the multiple antennas rather than separately realizing a monitoring apparatus for each transmit signal so that blocks in the RF calibration unit 350 are set to be shared when the transmit signals of the multiple antennas are monitored. That is, the RF calibration unit 350 according to the exemplary embodiment of the present invention can perform signal processing for monitoring a target transmit signal while the RF calibration unit 350 does not calibrate a transmit signal.

Figure 7:
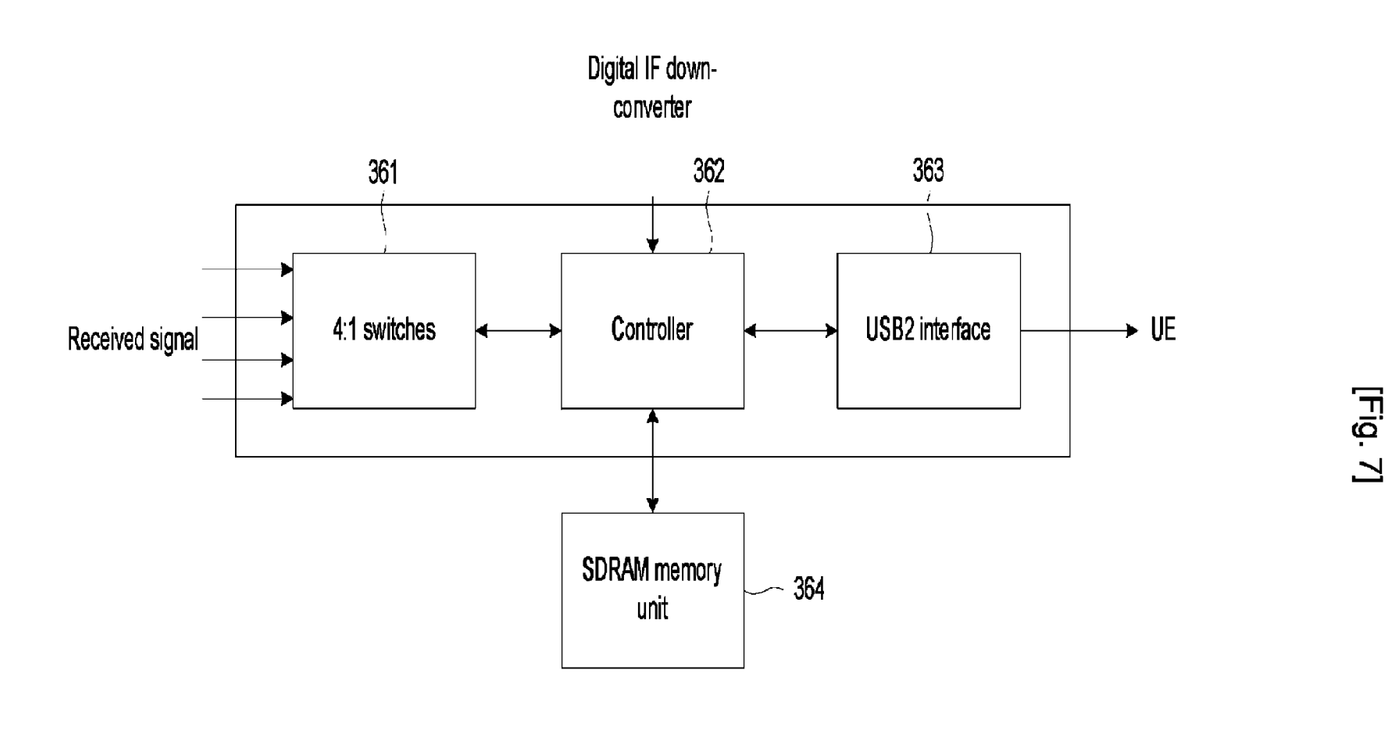
FIG. 7 is schematic block diagram of a signal monitoring unit according to the exemplary embodiment of the present invention.

FIG. 7 is schematic block diagram of a signal monitoring unit according to the exemplary embodiment of the present invention.

As shown in FIG. 7, the signal monitoring unit 360 includes 4:1 switches 361, a controller 362, a universal serial bus (USB) interface unit 363, and a synchronous dynamic random access memory (SDRAM) unit 363.

The 4:1 switches 361 receive a target receive signal to be monitored among a plurality of receive signals (e.g., four receive signals according to FIG. 3) output from the digital IF processor 340, and delivers the four signals to the controller 362.

The controller 362 receives signals from the 4:1 switches 361 and from the digital IF down-converter 354 of the RF calibration unit 350, or controls constituent elements, such as the 4:1 switches 351 and 361, the SDRAM unit 364, and the USB interface unit 363.

The USB interface unit 363 is configured to interface with the user interface (370 of FIG. 7), and it may be replaced with another interface. In addition, the SDRAM unit 363 is configured to store a target receive signal and a target transmit signal, and it may be replaced with any storing medium.

An application program is installed on the UE (370 of FIG. 7) in order to analyze and calculate performance indicators indicating system performance and display the analysis and calculation result on a screen, the performance indicators including those such as signal spectrum, signal strength, signal to noise ratio, and signal constellation. For example, the application program can be provided as an application program for a window-based graphics user interface (GUI). In addition, the application may provide a function for controlling the signal monitoring unit 360 to select the type (e.g., transmit signal of antenna #0, or receive signal of antenna #1) of a signal to be analyzed.

Figure 8:
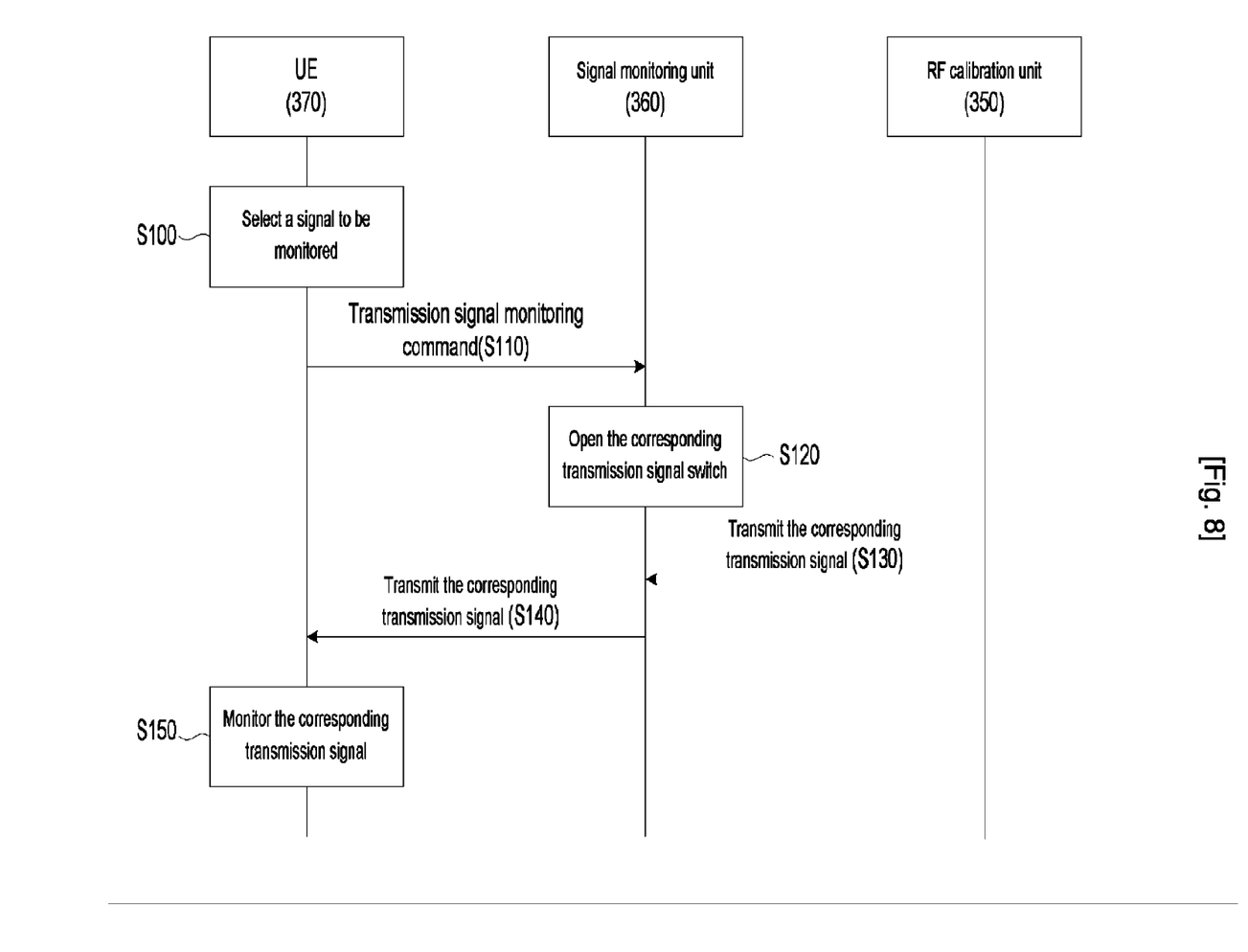
FIG. 8 is a flowchart for monitoring a signal transmitted to an antenna in the communication system according to the exemplary embodiment of the present invention.

FIG. 8 is a flowchart for monitoring a signal transmitted to an antenna in the communication system having the multiple antennas according to the exemplary embodiment of the present invention.

When a user selects a signal to be monitored among signals transmitted through the multiple antennas by using the application program of the UE 370, in step S100, a transmit signal monitoring command is transmitted to the controller (362 of FIG. 7) in the signal monitoring unit 360 through the USB interface unit (363 of FIG. 7), in step S110. The controller 362 analyzes the command transmitted from the UE 370 and controls the 4:1 switches (351 of FIG. 6) in the RF calibration unit 350 in response to the command.

As described, the RF calibration unit 350 can be used for monitoring the transmit signals of the multiple antennas. For example, when monitoring a transmit signal (i.e., target transmit signal) of the antenna #1 of FIG. 3, the controller 362 turns on a switch connected with the coupler 310 of the antenna #1 among the 4:1 switches 351 and turns off other switches. Then, the RF calibration unit 350 transmits a transmit signal to be transmitted to the antenna #1 to the signal monitoring unit 360, in step S130.

In this case, the antenna #1's RF transmit signal input to the RF calibration unit 350 is converted to a digital baseband signal through the RF down-converter 352, the A/D converter 353, and the digital IF down-converter 354 in the RF calibration unit 350, and the digital baseband signal is input to the signal monitoring unit 360. The signal monitoring unit 360 transmits the digital baseband signal of the antenna #1 to the UE 370 through the USB interface 363, in step S140, so that the UE 370 can monitor the transmit signal, in step S150.

As described, the signal monitoring unit 360 uses the RF calibration unit 350 for monitoring a transmit signal. In this case, the RF calibration unit 350 is in an idle time state, and therefore the signal monitoring unit 360 can share the blocks in the RF calibration unit 350 without interrupting the calibration function of the RF calibration unit 350. Therefore, there is no need for separately adding an apparatus for the monitoring of the transmit signal.

Figure 9:
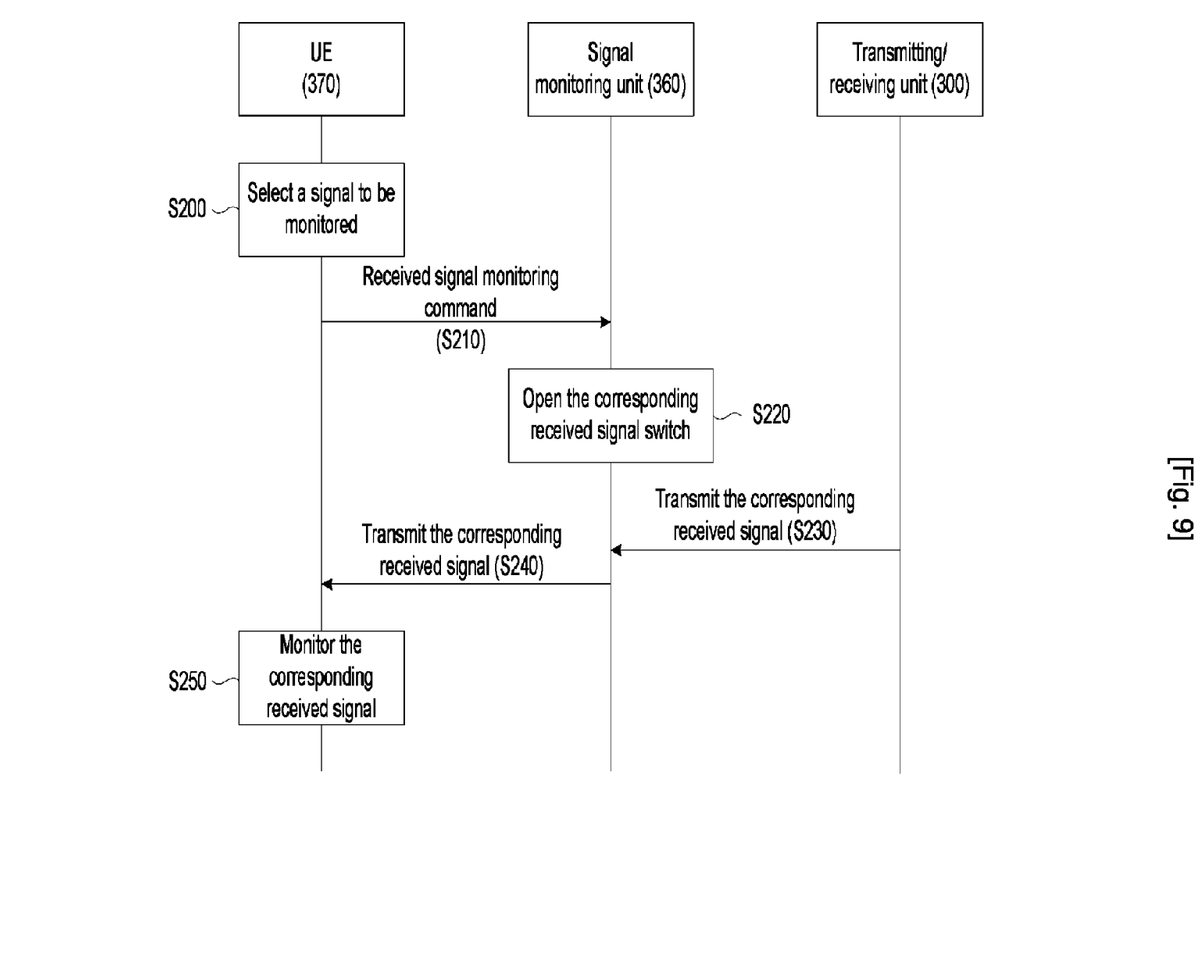
FIG. 9 is a flowchart for monitoring a signal received through an antenna of the communication system according to the exemplary embodiment of the present invention.

FIG. 9 is a flowchart for monitoring a signal received through an antenna in the communication system having the multiple antennas according to the exemplary embodiment of the present invention.

When the UE 370 selects a signal to be monitored among signals received through the plurality of antennas by using the application program, in step S200, a receive signal monitoring command is transmitted to the controller (362 of FIG. 7) of the signal monitoring unit 360 through the USB interface unit (363 of FIG. 7), in step S210. The controller 362 analyzes the command transmitted from the UE 370, and controls the 4:1 switches 361 in the signal monitoring unit 360 according to the command.

Unlike the monitoring of the transmit signal, the receive signal of the multiple antennas is monitored by using the transmitting/receiving unit 300. For example, when monitoring a target receive signal of the antenna #1 among the multiple antennas of FIG. 3, the controller 362 turns on a switch connected with an input of the digital IF processor 340 of the antenna #1 among the 4:1 switches 361 in step S220, and turns off switches connected with other antennas. Then, the transmitting/receiving unit 300 transmits the receive signal received through the antenna #1 to the signal monitoring unit 360, in step S230.

In this case, the receive signal of the antenna #1, input to the signal monitoring unit 360, is a signal which has been passed through the RF processor (330 of FIG. 3) and the digital IF processor (340 of FIG. 3) of the transmitting/receiving unit 300 and has been converted into a digital baseband signal for signal monitoring. The signal monitoring unit 360 transmits the digital baseband signal of the antenna #1 to the UE 370 through the USB interface 363 in step S240, and monitors the corresponding receive signal in step S250.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal monitoring apparatus of a base station in a communication system having a plurality of antennas, the signal monitoring apparatus comprising:
   a transmitting/receiving unit for transmitting a plurality of transmit signals by using the plurality of antennas and processing a plurality of receive signals received through the plurality of antennas;
   a radio frequency calibration unit for calibrating the plurality of transmit signals transmitted through the plurality of antennas and processing at least one target transmit signal among the plurality of transmit signals so as to monitor the at least one target transmit signal; and
   a signal monitoring unit for receiving at least one first signal or at least one second signal, and analyzing the at least one first signal or the at least one second signal to transmit the analysis result to user equipment, the at least one first signal being a signal processed from at least one target receive signal among the plurality of receive signals, and the at least one second signal being a signal processed from the at least one target transmit signal by controlling the radio frequency calibration unit,
   wherein the radio frequency calibration unit stops the signal processing for monitoring the at least one target transmit signal while performing calibration on the plurality of transmit signals.

2. The signal monitoring apparatus of claim 1, wherein the radio frequency calibration unit comprises:
   a switch for selecting and outputting the at least one target transmit signal among the plurality of transmit signals transmitted from the plurality of antennas according to control of the signal monitoring unit;
   a radio frequency down-converter for down-converting the at least one target transmit signal output from the switch into an analog intermediate frequency (IF) transmit signal;
   an analog to digital (A/D) converter for converting the analog IF transmit signal converted by the radio frequency down-converter into a digital IF transmit signal; and
   a digital IF down-converter for converting the digital IF transmit signal converted by the A/D converter into a digital baseband transmit signal to generate the at least one second signal.

3. The signal monitoring apparatus of claim 2, wherein the radio frequency calibration unit further comprises a calibration calculator for calculating a calibration coefficient so as to substantially equalize characteristics of the plurality of transmit signals, respectively corresponding to the plurality of transmit antennas, by using the digital baseband transmit signal.

4. The signal monitoring apparatus of claim 1, wherein the signal monitoring unit comprises:
 a switch for selecting and outputting the at least one first signal;
 a memory unit for storing the at least one first signal output from the switch and the at least one second signal;
 an interface unit for transmitting the at least one first signal and the at least one second signal stored in the memory unit to the UE; and
 a controller for controlling the radio frequency calibration unit and the switch, and for receiving the at least one first signal and the at least one second signal.

5. The signal monitoring apparatus of claim 1, wherein the radio frequency calibration unit converts the at least one target transmit signal into a baseband signal to monitor the at least one target transmit signal.

6. A signal monitoring apparatus of a base station in a communication system having a plurality of antennas, the signal monitoring apparatus comprising:
 an RF calibration unit for calibrating a plurality of transmit signals to be respectively transmitted through the plurality of antennas so as to equalize characteristics of the respective transmit signals, and for processing at least one target transmit signal among the plurality of transmit signals while not performing the calibration; and
 a signal monitoring unit for analyzing a signal processed from the at least one target transmit signal and transmitting the analysis result to user equipment (UE),
 wherein the RF calibration unit comprises at least one switch for selecting and outputting a plurality of reference signals, respectively corresponding to the plurality of transmit signals, for a first period during which the calibration is performed, and for selecting and outputting the at least one target transmit signal for a second period during which the processing is performed.

7. The signal monitoring apparatus of claim 6, further comprising:
 an RF processor for transmitting the plurality of transmit signals and processing a plurality of receive signals received through the plurality of antennas.

8. The signal monitoring apparatus of claim 7, wherein the RF processor analyzes a signal processed from at least one target receive signal among the plurality of receive signals and transmits the analysis result to the UE.

9. The signal monitoring apparatus of claim 6, wherein the RF calibration unit comprises:
 an analog/digital (A/D) converter and a digital intermediate frequency (IF) converter for converting a plurality of first signals, respectively corresponding to the plurality of reference signals, into digital baseband signals for the first period, and for converting at least one second signal corresponding to the at least one target transmit signal into a digital baseband signal for the second period.

10. A method for monitoring a signal of a base station in a communication system having a plurality of antennas, the method comprising:
 calibrating a plurality of transmit signals to be transmitted through the plurality of antennas so as to equalize characteristics of the respective transmit signals;
 processing at least one target transmit signal among the plurality of transmit signals while the calibration is not performed;
 selecting and outputting a plurality of reference signals, respectively corresponding to the plurality of transmit signals, for a first period during which the calibration is performed;
 selecting and outputting the processed at least one target transmit signal for a second period during which the processing is performed; and
 analyzing the selected signal processed from the at least one target transmit signal to transmit the analysis result to user equipment (UE).

11. The method of claim 10, further comprising:
 transmitting the plurality of transmit signals by using the plurality of antennas; and
 processing a plurality of receive signals received through the plurality of antennas.

12. The method of claim 11, further comprising analyzing a signal processed from at least one target receive signal among the plurality of receive signals and transmitting the analysis result to the UE.

* * * * *